(12) United States Patent
Bhat et al.

(10) Patent No.: US 7,594,256 B2
(45) Date of Patent: Sep. 22, 2009

(54) REMOTE INTERFACE FOR POLICY DECISIONS GOVERNING ACCESS CONTROL

(75) Inventors: Shivaram Bhat, Sunnyvale, CA (US); Hua Cui, Fremont, CA (US); Ping Luo, Union City, CA (US); Dilli Dorai Minnal Arumugam, Cupertino, CA (US); Aravindan Ranganathan, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 759 days.

(21) Appl. No.: 10/608,882

(22) Filed: Jun. 26, 2003

(65) Prior Publication Data

US 2005/0021978 A1 Jan. 27, 2005

(51) Int. Cl.
*H04L 9/00* (2006.01)
(52) U.S. Cl. ............................................. 726/1; 726/14
(58) Field of Classification Search .................. 713/182; 726/1
See application file for complete search history.

(56) References Cited

U.S. PATENT DOCUMENTS

| | | | |
|---|---|---|---|
| 5,634,122 A | 5/1997 | Loucks et al. | |
| 5,802,062 A | 9/1998 | Gehani et al. | |
| 6,178,505 B1 * | 1/2001 | Schneider et al. | ........... 713/168 |
| 6,182,142 B1 | 1/2001 | Win et al. | |
| 6,226,666 B1 | 5/2001 | Chang et al. | |
| 6,243,816 B1 | 6/2001 | Fang et al. | |
| 6,263,432 B1 | 7/2001 | Sasmazel et al. | |
| 6,317,838 B1 | 11/2001 | Baize | |
| 6,362,836 B1 | 3/2002 | Shaw et al. | |
| 6,453,353 B1 | 9/2002 | Win et al. | |
| 6,463,470 B1 * | 10/2002 | Mohaban et al. | ............. 709/223 |
| 6,513,158 B1 | 1/2003 | Yogaratnam | |
| 6,587,867 B1 | 7/2003 | Miller et al. | |
| 6,668,322 B1 | 12/2003 | Wood et al. | |
| 6,687,229 B1 | 2/2004 | Kataria et al. | |
| 6,799,208 B1 | 9/2004 | Sankaranarayan et al. | |
| 6,920,494 B2 | 7/2005 | Heitman et al. | |

(Continued)

FOREIGN PATENT DOCUMENTS

EP 1009130 A1 6/2000

(Continued)

OTHER PUBLICATIONS

European Search Report dated Sep. 5, 2005.

(Continued)

*Primary Examiner*—Nasser G Moazzami
*Assistant Examiner*—Carlton V Johnson
(74) *Attorney, Agent, or Firm*—Osha • Liang LLP

(57) ABSTRACT

Methods and systems thereof for controlling access to resources are described. When a user attempts to access a resource via a remote interface such as a Web server, the request is initially evaluated by a source of policy definitions such as a policy server. This source returns a policy decision to the remote interface. The policy decision is stored in memory by the remote interface. The remote interface can then evaluate subsequent requests from the user for the resource using the stored policy decision instead of having to communicate again with the source for the policy decision. Enhancements to this approach are also described. Accordingly, policy definitions and decisions are more efficiently implemented.

12 Claims, 5 Drawing Sheets

U.S. PATENT DOCUMENTS

| | | |
|---|---|---|
| 6,957,261 B2 | 10/2005 | Lortz |
| 2001/0037469 A1 | 11/2001 | Gupta et al. |
| 2002/0104015 A1 | 8/2002 | Barzilai et al. |
| 2002/0133723 A1 | 9/2002 | Tait |
| 2002/0169907 A1 | 11/2002 | Candea et al. |
| 2002/0184507 A1 | 12/2002 | Makower et al. |
| 2002/0184535 A1 | 12/2002 | Moaven et al. |
| 2002/0188513 A1 | 12/2002 | Gil et al. |
| 2003/0018786 A1 | 1/2003 | Lortz |
| 2003/0021283 A1* | 1/2003 | See et al. .................... 370/401 |
| 2003/0074580 A1 | 4/2003 | Knouse et al. |
| 2003/0088786 A1 | 5/2003 | Moran et al. |
| 2003/0093509 A1 | 5/2003 | Li et al. |
| 2003/0115322 A1* | 6/2003 | Moriconi et al. ............ 709/224 |
| 2003/0200465 A1 | 10/2003 | Bhat et al. |
| 2003/0204619 A1 | 10/2003 | Bays |
| 2004/0054791 A1* | 3/2004 | Chakraborty et al. ....... 709/229 |
| 2004/0073668 A1 | 4/2004 | Bhat et al. |
| 2004/0165007 A1 | 8/2004 | Shafron |
| 2005/0021818 A1* | 1/2005 | Singhal et al. .............. 709/232 |
| 2005/0021978 A1 | 1/2005 | Bhat et al. |
| 2005/0117576 A1 | 6/2005 | McDysan et al. |

FOREIGN PATENT DOCUMENTS

| | | |
|---|---|---|
| EP | 1-089-516 A | 4/2001 |
| WO | WO-01/11452 A | 2/2001 |

OTHER PUBLICATIONS

Samar V: "*Single Sign-On Using Cookies for Web Applications*", IEEE 8$^{th}$ International Workshops on Enabling Technologies: Infrastructure for Collaborative Enterprises, Stanford, CA, USA; Jun. 16, 1999; pp. 158-163.

* cited by examiner

REMOTE INTERFACE FOR POLICY DECISIONS GOVERNING ACCESS CONTROL

BACKGROUND OF THE INVENTION

1. Field of the Invention

The field of the invention relates to computer-implemented policies for controlling access to private resources.

2. Related Art

In a corporate environment, users on an internal network (e.g., an Intranet) have access to resources that would not typically be accessible to users that are not connected to the internal network. By limiting the use of these resources to users connected to the internal network, a degree of security can be provided because only users inside the corporation can access the applications. Although somewhat secure, users can find this approach inconvenient, because some users need to access applications on a corporate server when they are not at the office (and thus not connected via an Intranet).

To overcome this problem, some networks are configured to allow remote access to a server over the Internet. To achieve secure remote access to a server, corporations create a "portal" for users to log into the server while not connected to the Intranet. Typically, a user will provide credentials such as a user name and password to gain access to the server over the Internet. Policies are defined and enforced that control access to particular resources available on the server, to prevent unauthorized use of those resources. These policies reside on a policy server. Once an authenticated user has been granted access to a server and requests access to a resource on the server, the server checks with the policy server to verify that the user is authorized to access the resource. Such a system can also be used to control access to resources when users access the server via the internal network.

Referring now to Prior Art FIG. 1, a block diagram of a portion of a general network system 10 is shown. The system 10 includes a remote node 20 coupled to a server 22 (e.g., a Web server). Residing on the server 22 is a resource, perhaps identified by some type of Uniform Resource Identifier or Uniform Resource Locator. Typically, a user at node 20 will attempt to access the resource over the Internet. In a corporate environment, the client node 20 could be connected to the server 22 by an internal network (e.g., an Intranet).

Before allowing access to the resource, the server 22 needs to verify that the user has the necessary authority to do so. To accomplish this, the server 22 accesses a policy server 24. The policy server evaluates the request against a defined policy, and returns to the server 22 a decision with regard to whether access is granted or not.

The approach just described is problematic because of its inefficiency. Usually, there are many client nodes and many servers, and consequently many requests for resources. Each request to server 22 results in back-and-forth communication between the server 22 and the policy server 24. In addition, each request to server 22 needs to be evaluated by the policy server 24. As a consequence, a measurable portion of network resources, including the computational resources of policy server 24 as well as communication bandwidth, are consumed in support of implementing access control policies.

SUMMARY OF THE INVENTION

Accordingly, a method and/or system that can more efficiently implement access control policies would be of value. Embodiments of the present invention provide such a solution.

According to one embodiment of the present invention, when a user attempts to access a resource residing on (or under the control of) a Web server, for example, the request is initially evaluated by a source of policy definitions such as a policy server. The policy server returns a policy decision to the Web server, which can also be referred to as a policy enforcement point (PEP). The policy decision is stored (cached) in memory by the PEP. The PEP can then evaluate subsequent requests from the user for the resource using the stored policy decision instead of having to communicate again with the policy server. In this manner, the Web server operates as a remote interface for implementing and enforcing policy definitions and decisions on behalf of the policy server.

In one embodiment, when the request is initially evaluated by the policy server, only the policy decision for the requested resource is provided to the PEP. However, the requested resource can be a base or root resource having a number of affiliated sub-resources. The requested resource can also be a sub-resource of a base or root resource that is affiliated with a number of other sub-resources. Thus, in general, the requested resource can be affiliated with other resources, either as the base resource of other sub-resources or through its relationship with a base resource shared by other sub-resources. In one embodiment, a policy decision for at least one of the other resources affiliated with the requested resource is also received at the PEP from the policy server, and stored by the PEP. In one such embodiment, policy decisions for all of the resources affiliated with the requested resources are returned by the policy server and stored by the PEP.

There can be instances in which a policy definition is changed after a policy decision has been made and is stored at the PEP. In one embodiment, when a policy definition is changed, the source (e.g., the policy server) sends out notifications to the PEPs, or at least to those PEPs that are affected by the change. In one such embodiment, the notification also includes an updated version of the policy decision based on the change. In another such embodiment, in response to the notification, the PEP marks the affected policy decision, and seeks an updated policy decision only if the user makes another request for the associated resource. In lieu of receiving notifications, a PEP can instead send requests for updates on policy decisions to the source on a periodic basis.

There can be one or more conditions associated with a policy decision. For example, a policy decision granting access to a resource can be conditioned on the user being authenticated using a particular authentication mechanism. In one embodiment, along with a policy decision, the source (e.g., the policy server) also provides to the PEP the condition(s) associated with the policy decision. The PEP stores the condition, which is also referred to as an advice, and enforces the condition without having to communicate again with the source.

There can be instances in which a policy decision is valid only for a certain period of time. In one embodiment, along with a policy decision, the source (e.g., the policy server) also includes information that is descriptive of the period of time that the policy decision is in effect. This period of validity is also referred to as "time-to-live." In effect, time-to-live is one type of a condition or advice.

Therefore, according to the various embodiments of the invention, policy decisions are more efficiently implemented at the PEP. As a result, network resources are conserved. These and other objects and advantages of the present invention will no doubt become obvious to those of ordinary skill in the art after having read the following detailed description of the preferred embodiments, which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

Prior Art

DETAILED DESCRIPTION OF THE INVENTION

Figure 1:
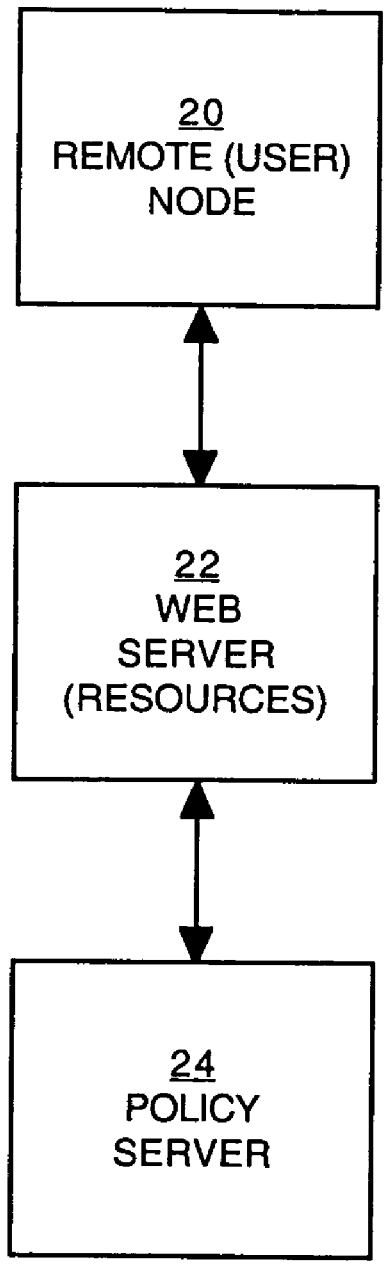
FIG. 1 is a block diagram of a prior art system for controlling access to resources.

Reference will now be made in detail to the various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the present invention.

Notation and Nomenclature

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving," "forwarding," "returning," "sending," "caching," "evaluating," "storing," "marking," "providing" or the like, refer to the action and processes (e.g., flowchart 500 of FIG. 5) of a computer system or similar intelligent electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention allow the tasks of defining and implementing (evaluating) access control "policies" to be delegated using a policy "referral." Access control policies can contain "rules," "subjects" and "conditions" that are evaluated to determine whether access to a "resource" will be granted to a requestor (e.g., a "subject"), and what actions can be performed on or using the resource should access be granted. Referral policies can contain rules, subjects, conditions and referrals. The term "policy definition" is used herein to refer to an access control policy or referral policy that has been defined and which can be implemented in software.

The following is a format that can be used to define a policy, although embodiments of the present invention are not so limited:

[[Rule][Subject][Referral][Condition]].

There can be one or more rules, subjects, referrals and conditions in the policy. Moreover, a policy can be defined without a subject, referral, and/or condition.

A resource (e.g., a service or application) can have more than one policy associated with it. Examples in which there can be multiple policies for a resource would typically exist in an Internet Service Provider (ISP) or Application Service Provider (ASP) environment that hosts multiple organizations, each organization having its own specific policy. These organization-specific policies can be implemented using policy referrals.

As mentioned, policies can be based solely on subject(s). A subject can define an individual user or a collection (group) of users to whom the policy applies. Access to and use of a resource can be granted to a user recognized as having a certain role (e.g., manager) or as being a member of a certain group (e.g., marketing).

Usually, persons or entities identify themselves during the authentication process. Once they have been authenticated, they are provided with one or more identities referred to using the term "principal." The term "principal" can refer to an identity of the user (or an entity) as represented (or understood) by an application, or a server, or a device.

Hence, a subject can represent a collection of identities, wherein each identity is represented as a principal. For example, Jane Doe is a subject. Jane Doe may have a first e-mail account under the principal name 'jdoe,' a second e-mail account under the principal name 'janedoe,' and an e-commerce buyer service account under the principal name 'jane_doe'. Thus, the same subject, Jane Doe, has three principal names (or identities) based on which service she accesses. Principals usually become associated with a subject upon successful authentication to a resource (e.g., an application or a service). Because a subject can represent a nameless container holding relevant information for a user, while principals can represent named identities for that subject, the set of permissions granted to a subject depends on the principals associated with that subject and not on the subject itself.

A rule is a combination of "service type," "resource," "action" and "action value." The following is a format that can be used to define a rule, although embodiments of the present invention are not so limited:

[<Service Type>, <Resource>, [<Action>, <Action Value(s)>]].

There can be one or more action values, and either one resource name or no resource names. A service type is a general term used to identify the type of application, service or device. Service types can be selected from a set of pre-defined terms. Example service types are Web service, mail service, etc.

A resource is an object defined by the service type and identifiable by a unique name. A resource can be an application or a service, for example. The resource name can be an object name (e.g., MailServer1), a Uniform Resource Identifier (URI) or Uniform Resource Locator (URL), or some other type of unique identifier. A resource can be a Web site such as http://abcweb.abc.com.

An action refers to an operation or an event that can be performed on a resource. An action value refers to the value(s) an action can have. For example, an action can be a get, put, delete, or post operation according to the Hypertext Transfer Protocol (HTTP). For each of these actions, there can be an action value, such as allow/deny or yes/no. Thus, the action value can define whether the action is permitted.

The preceding example illustrates binary actions. Non-binary actions are possible as well. For example, a catalog service could have the following actions: allowed_Discount, purchase_Options, etc. For the catalog service, the allowed_Discount action can have a number as its action value. The purchase_Options action can have certain pre-defined strings as its action values. Hence, action values can be arbitrary in format (e.g., Boolean, numeric, string, single value or multi-valued).

A condition can represent the constraints on a rule or a policy. For example, a constraint can be that an action of updating a catalog can only take place from 8:00 AM-8:00 PM. Another constraint can grant this action only if the request originates from a given set of IP (Internet Protocol) addresses or from the company Intranet.

When a resource is subject to an access control policy, an initial request by a user for access to the resource is evaluated by a policy server, which can also be referred to as a policy decision point, a policy engine or policy evaluator. The policy engine returns a "policy decision." A policy decision refers to the value(s) returned by the policy engine/server. For example, in the case of Boolean actions, values for the policy decision can be true/false (or allow/deny or yes/no). The policy decision can be used to allow access to a resource, and to define the actions that can be performed on the resource or using the resource after access is gained. In general, a policy decision also includes information identifying the resource(s) to which it applies as well as the subject (e.g., individual user or group of users) to which it applies.

According to the embodiments of the present invention, the policy decision is stored (cached) by a remote interface (e.g., a server) on which the resource resides, or that otherwise controls access to the resource. In this context, the remote interface or server can be referred to as a policy enforcement point. Subsequent requests from the user are evaluated using the remote interface instead of the policy engine. This is described further in conjunction with FIGS. 3, 4 and 5, below.

A policy referral involves the concept of forwarding a request for a particular resource from one policy decision point to another for evaluation. For example, in an ISP/ASP environment (and possibly within an enterprise), it may be necessary to delegate the policy definitions, evaluations and decisions for a resource to other organizations or sub-organizations. Taking the example of a Web service, an ISP can refer the policy decision for the resource http://www.acme.com to the ACME organization, and similarly the resource http://www.abc.com to the Abc organization. Additionally, it is possible to delegate the policy definitions, evaluations and decisions for a resource to other products that implement policies (e.g., the delegation can take place across products from different vendors).

Figure 2:
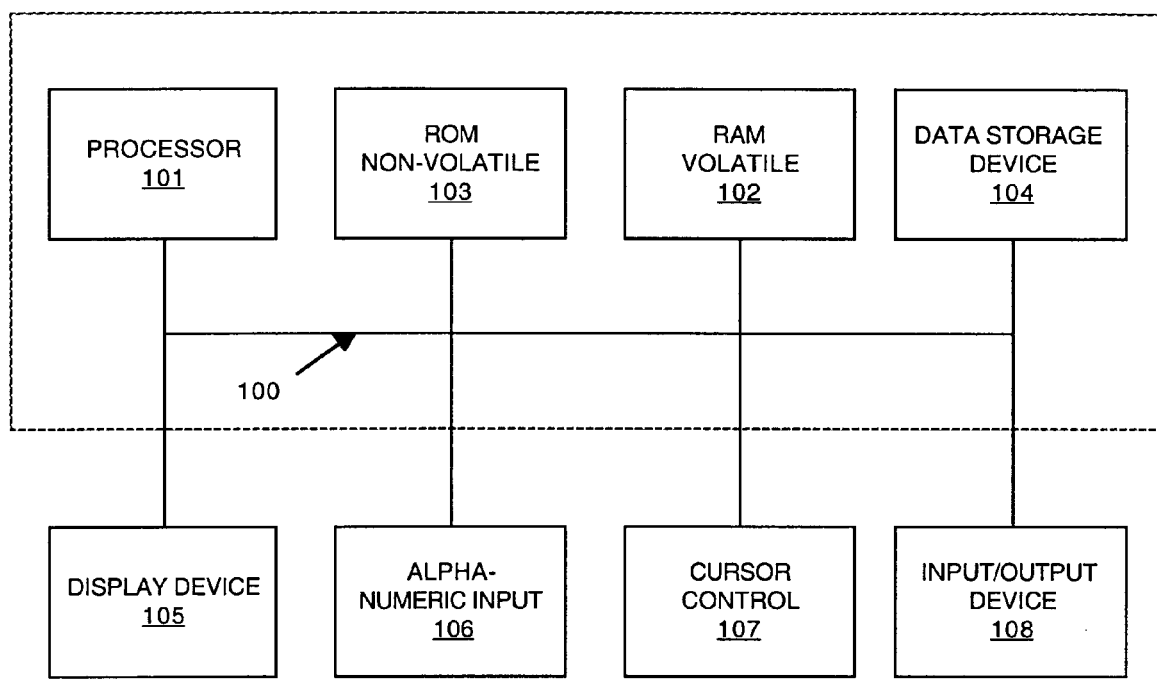
FIG. 2 is a block diagram of an exemplary computer system upon which embodiments of the present invention can be implemented.

Referring first to FIG. 2, a block diagram of an exemplary computer system 112 is shown. It is appreciated that computer system 112 described herein illustrates an exemplary configuration of an operational platform upon which embodiments of the present invention can be implemented. Nevertheless, other computer systems with differing configurations can also be used in place of computer system 112 within the scope of the present invention.

Computer system 112 includes an address/data bus 100 for communicating information, a central processor 101 coupled with bus 100 for processing information and instructions; a volatile memory unit 102 (e.g., random access memory [RAM], static RAM, dynamic RAM, etc.) coupled with bus 100 for storing information and instructions for central processor 101; and a non-volatile memory unit 103 (e.g., read only memory [ROM], programmable ROM, flash memory, EPROM, EEPROM, etc.) coupled with bus 100 for storing static information and instructions for processor 101. Computer system 112 can also contain an optional display device 105 coupled to bus 100 for displaying information to the computer user. Moreover, computer system 112 also includes a data storage device 104 (e.g., disk drive) for storing information and instructions.

Also included in computer system 112 is an optional alpha-numeric input device 106. Device 106 can communicate information and command selections to central processor 101. Computer system 112 also includes an optional cursor control or directing device 107 coupled to bus 100 for communicating user input information and command selections to central processor 101. Computer system 112 also includes signal communication interface (input/output device) 108, which is also coupled to bus 100, and can be a serial port. Communication interface 108 can also include wireless communication mechanisms.

Access Control Policy Architecture

Figure 3:
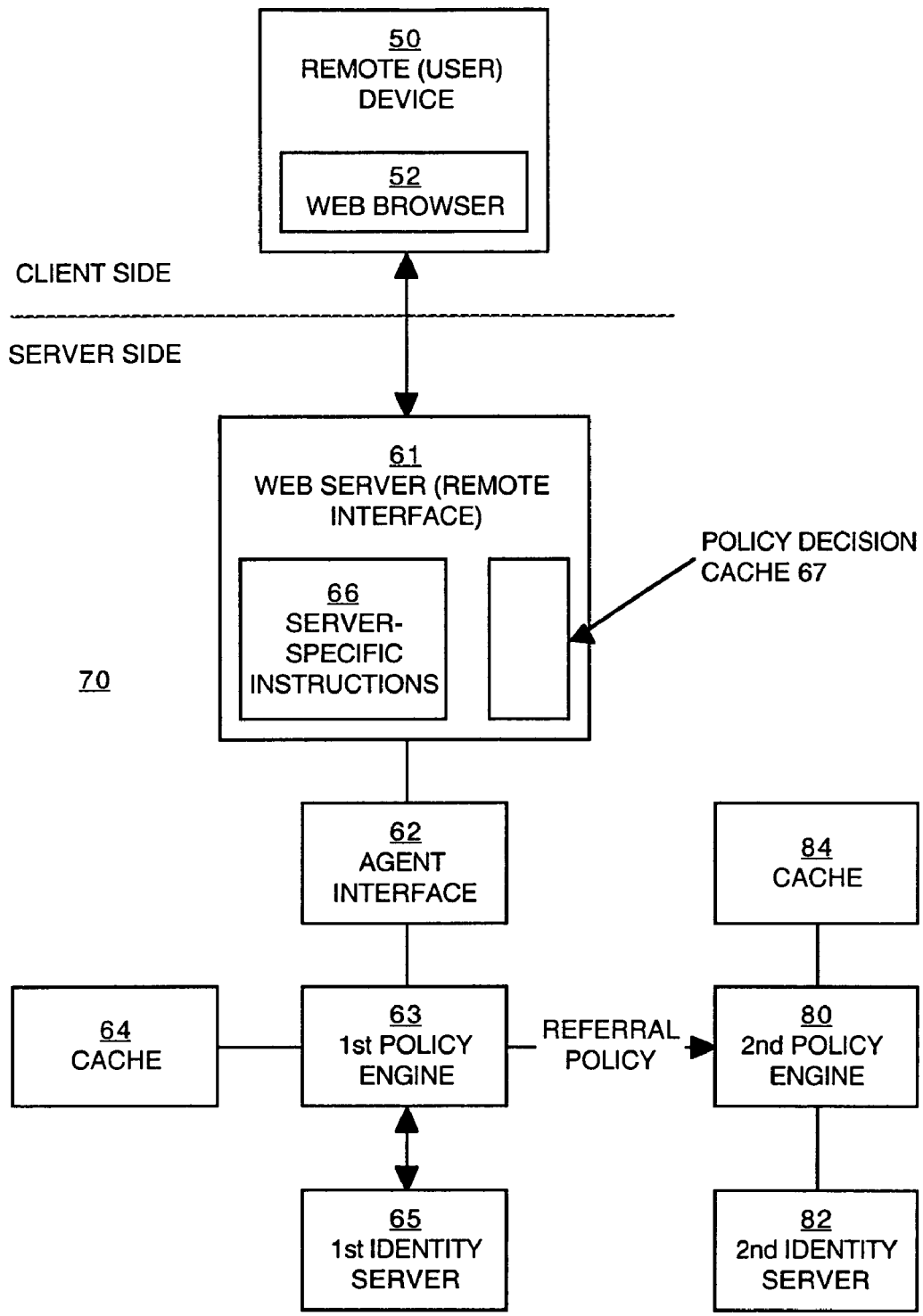
FIG. 3 illustrates an access control policy architecture in accordance with one embodiment of the present invention.

FIG. 3 illustrates an access control policy architecture 70 in accordance with one embodiment of the present invention. The embodiment illustrated by FIG. 3 includes a number of functional blocks illustrated as separate elements. It is appreciated that the functionality provided by any of these elements can be combined and/or integrated with the functionality of one or more of the other elements. It is further appreciated that the architecture 70 can include additional elements not shown or described herein, and that the elements shown by FIG. 3 can implement additional functions not described herein. For example, the identity servers can each be coupled to a directory server that provides a database of user information, or the identity server can incorporate the functionality of a directory server. In addition, it is appreciated that the terms "first" and "second" are not relative terms but are used herein to differentiate between similarly named elements.

In the present embodiment, the architecture 70 includes a Web server 61, such as a Sun™ One Web, Apache, or Microsoft IIS (Internet Information Services) server, although the Web server 61 could be any server running on any platform. The Web server 61 can also be referred to as a remote interface (for the policy engines 63 and 80) or as a policy enforcement point.

The server-specific instructions module 66 is a part of the architecture 70 that is specific to the Web server 61. The server-specific instructions module 66 intercepts an HTTP request for access to a resource on the Web server 61. The server-specific instructions are generally minimal even though different Web servers use different interfaces for implementing HTTP. For example, Sun™ One Web servers use NSAPI (Netscape Server Application Programming Interface) and IIS Web servers use ISAPI (Internet Server Application Programming Interface). However, both NSAPI and ISAPI comply with the same HTTP specifications. Accordingly, the basic mechanism for intercepting an HTTP event and enforcing policy for the resource is the same for both NSAPI and ISAPI.

The first and second policy engines 63 and 80 can also be referred to as policy decision points or policy evaluators. In general, in the present embodiment, the functions of the first policy engine 63 and of the second policy engine 80 include: defining policies for resources; evaluating the policies using the policy definitions; and returning the policy values (policy decisions) to Web server 61 (or an agent that serves Web server 61). The first and second policy engines 63 and 80 can also provide data coherency functions; that is, they can detect changes to the policy definitions, and update the caches 64 and 84 accordingly.

Note that, although in the example of FIG. 3 there are two policy engines, there can be in actuality more than two policy engines. In addition, if policy referrals are not implemented, there can be a single policy engine (e.g., first policy engine 63).

In one embodiment, the policy definitions for first policy engine 63 are stored on first identity server 65, and the policy definitions for second policy engine 80 are stored on second identity server 82. However, first policy engine 63 can utilize a cache memory 64 for storing policy definitions; once a policy definition is loaded in the cache memory 64, the first policy engine 63 does not need to fetch that information from first identity server 65, thus reducing the time it takes to retrieve policy definitions. In a similar manner, second policy engine 80 can store policy definitions in a cache memory 84.

First and second identity servers 65 and 82 can also include directory information or other information used in the definition and evaluation of policies. For example, these servers can have databases that include user (subject) information, such as names, addresses, and the like. These servers can also include attributes that identify which group or groups each subject belongs to (e.g., an attribute for "manager," another attribute for "marketing," etc.). Furthermore, these servers can include attributes associating each subject with their principal(s). As mentioned above, the first and second identity servers 65 and 82 can instead retrieve this information from one or more directory servers.

In the present embodiment, when a user makes an initial request for access to a resource, the server-specific instructions module 66 (or an agent providing similar functionality) intercepts the user's initial request and communicates with the first policy engine 63 to determine if the resource is subject to a policy (e.g., an access control policy). If the resource is not subject to a policy, the user's initial request is directed to the resource (that is, access to the resource is granted). Conversely, if the resource is subject to a policy, the user's initial request is referred to first policy engine 63, so that a determination can be made regarding whether or not access to the resource should be granted.

According to the present embodiment of the present invention, either first policy engine 63 or second policy engine 80 will perform the policy evaluation and return a policy decision to Web server 61 for enforcement. Which of these policy engines performs the policy evaluation depends on whether or not a referral policy for the resource of interest is in place in first policy engine 63. In essence, if a referral policy applicable to the resource of interest is in place, the policy evaluation is performed by second policy engine 80; otherwise, the policy evaluation is performed by the first policy engine 63. Additional information regarding policy referrals can be found in the co-pending, commonly owned U.S. patent application Ser. No. 10/269,957, filed Oct. 10, 2002, by S. Bhat et al., and entitled "Policy Delegation for Access Control," hereby incorporated by reference.

Once the policy definition is accessed and the policy evaluation completed (either by first policy engine 63 if there is no referral policy for the resource of interest, or by second policy engine 80 if there is a referral policy for that resource), the Web server 61 (or an agent serving Web server 61) uses the resultant policy decision to enforce the policy decision.

Significantly, according to the present embodiment of the present invention, the policy decision provided to Web server 61 in response to the user's initial request is stored (cached) on Web server 61 in, for example, policy decision cache 67. Because the policy decision is stored at Web server 61, a subsequent request by the same user for the same resource can be evaluated by Web server 61. That is, Web server 61 does not need to refer the request to a policy engine for evaluation, as was the case for the initial resource request. The net effect is to reduce the number of requests that are referred to the policy engine(s) for evaluation. In this manner, access control is made more efficient, and network resources such as the computational resources of the policy engine and network bandwidth are conserved.

Figure 4:
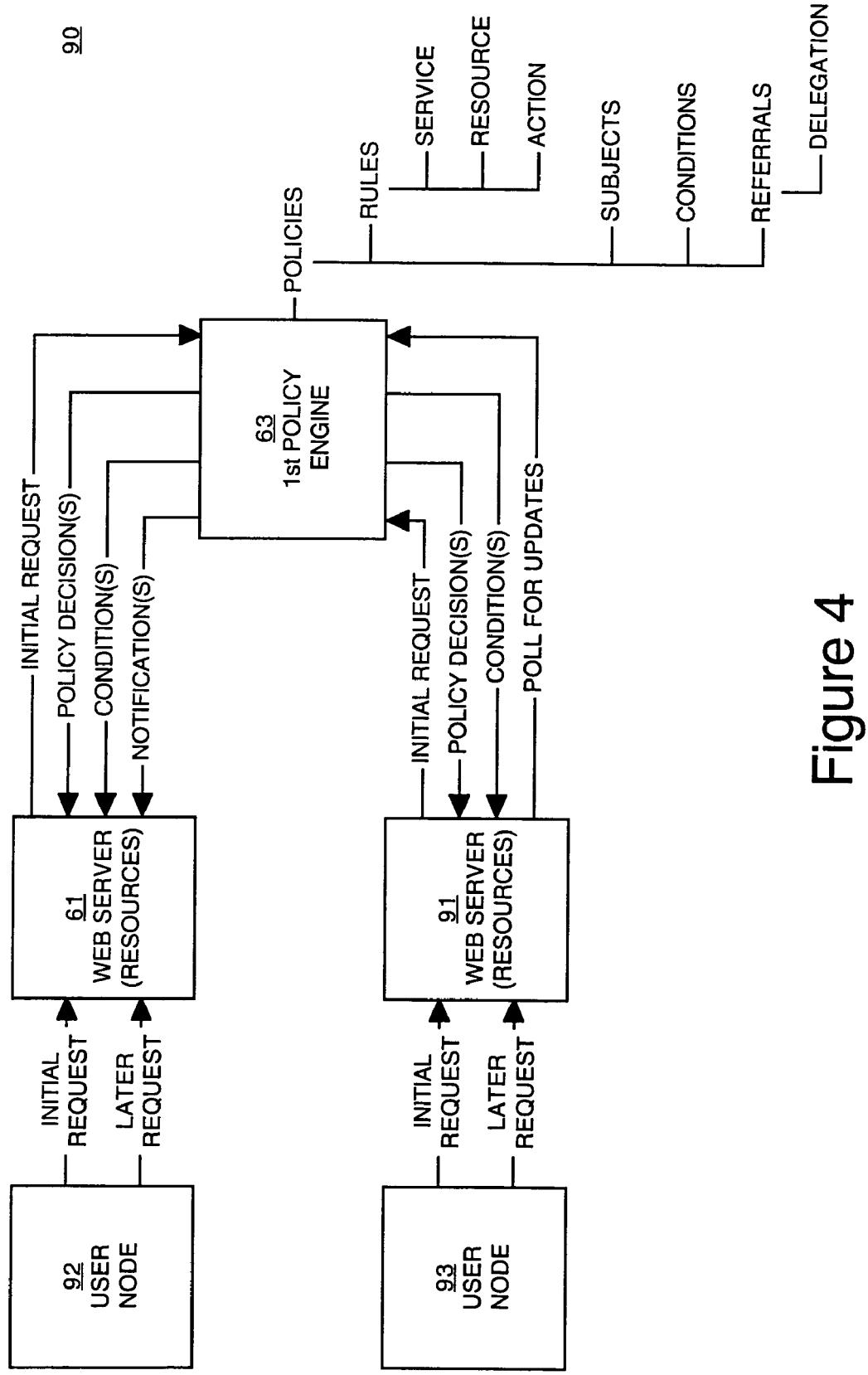
FIG. 4 is a data flow diagram for an access control policy architecture in accordance with one embodiment of the present invention.

FIG. 4 is a data flow diagram for an access control policy architecture 90 in accordance with one embodiment of the present invention. In the example of FIG. 4, architecture 90 includes a first Web server 61 and a second Web server 91, each coupled to first policy engine 63. It is appreciated that FIG. 4 illustrates only a portion of an access control policy architecture, and that the architecture can include elements other than those shown.

Residing on the Web servers 61 and 91 are resources that are subject to an access control policy (other resources not subject to such policies can also reside on these servers). In the example of FIG. 4, user node 92 is shown as communicating with Web server 61, and user node 93 is shown as communicating with Web server 91. Other user nodes can also be in communication with these servers, and each user node can communicate with multiple servers.

In the example of FIG. 4, user node 92 sends an initial request for a resource residing on (or under the control of) Web server 61. The initial request includes information identifying the requester (a user or subject). In some manner, the identity of the requester is authenticated. In one embodiment, a single sign on token (SSOToken) is used for authentication purposes; generally, if such a token is present in the request, then the requestor has been already authenticated. It is appreciated that other authentication schemes can be used in accordance with the present invention.

In the case in which the resource that is requested is subject to an access control policy, Web server 61 refers the user's initial request to first policy engine 63 for evaluation. In response to the user's initial request, first policy engine 63 returns a policy decision for the requested resource to Web server 61. It is appreciated that the policy decision is unique to the requester. For example, if two requesters independently seek access to the same resource, an independent policy decision is made, returned and stored for each requester. For simplicity of discussion, the examples described below are for a single requester. That is, when reference is made to an initial request and a later request, the discussion presumes that the same requestor is making these requests. The discussion also presumes that the requestor is authenticated.

An example of a policy decision is provided by the following:

resource: http://www.abc.com
action: GET
action value: allow
user name: admin

In the above example, the resource is identified as http://www.abc.com. There can be other resources affiliated with that resource. In one implementation, these other resources are organized in a hierarchical structure, exemplified as follows:

http://www.abc.com
http://www.abc.com/MyAbc
http://www.abc.com/MyAbc/AbcStore

The resources identified as http://www.abc.com/MyAbc and http://www.abc.com/MyAbc/AbcStore are referred to herein as "sub-resources" of the resource http://www.abc.com, and the resource http://www.abc.com is referred to herein as the base or root resource for http://www.abc.com/MyAbc and http://www.abc.com/MyAbc/AbcStore. Similarly, http://www.abc.com/MyAbc/AbcStore is referred to herein as a sub-resource of http://www.abc.com/MyAbc, and http://www.abc.com/MyAbc is referred to herein as the base or root resource for http://www.abc.com/MyAbc/AbcStore.

Each of the base and sub-resources can also be subject to an access control policy. In one embodiment, when an initial request for one of the resources is referred to first policy engine 63 and a policy decision for that resource is returned to Web server 61, a policy decision for at least one of the other resources affiliated with that resource is also returned. If a request is made to access a base resource, a policy decision can be returned for some or all of the sub-resources affiliated with that base resource. For example, if the requested resource is http://www.abc.com, then a policy decision for each of the sub-resources of http://www.abc.com can be returned.

If a request is made for a resource that is a sub-resource of a base resource, a policy decision for some or all of the other sub-resources that share the base resource of the requested sub-resource can be returned. For example, consider an example in which the requested resource is http://www.abc.com/MyAbc. The base resource for http://www.abc.com/MyAbc is http://www.abc.com. In one implementation, a policy decision for each of the sub-resources of http://www.abc.com is returned. Alternatively, only a policy decision for each of the sub-resources of http://www.abc.com/MyAbc is returned.

In the manner just described, further efficiencies are realized because, in response to a user's initial request for a resource, policy decisions for affiliated resources can also be provided. Thus, later requests by the user for any of the affiliated resources can be evaluated by Web server 61. That is, Web server 61 does not need to separately refer the later requests to a policy engine for evaluation, and policy engine 63 does not need to separately evaluate each of those requests.

In this manner, access control is made more efficient, and network resources such as the computational resources of the policy engine and network bandwidth are conserved.

Notifications

It is recognized that a policy definition can change with time, and that a change in a policy definition can change a policy decision that has been already made and stored at the policy enforcement points (e.g., Web servers 61 and 91). To address this, in one embodiment, "notifications" are used to communicate to policy enforcement points that there is a change to a policy definition, evaluation and/or decision. (It is recognized that some policy enforcement points cannot receive notifications; this case is addressed later herein.)

First, cases in which policy enforcement points can receive notifications are discussed. In one embodiment, notifications are broadcast to all of the policy enforcement points. In another embodiment, notifications are directed only to the policy enforcement points affected by a policy change. Initially—for example, when Web server 61 establishes a link with first policy engine 63—Web server 61 authenticates itself to first policy engine 63. At that time, Web server 61 can register for notifications pertaining to certain resources, specifically those resources resident on Web server 61. Web server 61 can also inform first policy engine 63 of the resources resident on Web server 61. Alternatively, Web server 61 can inform first policy engine 63 of the policy decisions stored on Web server 61. Furthermore, first policy engine 63 can keep track of the policy decisions it has returned to Web server 61. In general, sufficient information is available to first policy engine 63 to allow it to direct notifications to certain policy enforcement points in lieu of broadcasting notifications to all policy enforcement points. However, broadcasting notifications remains a viable alternative.

Thus, a notification is used to inform policy enforcement points that there is a policy change. The notification identifies the policy decision(s) affected by the change. Alternatively, the notification identifies the resource(s) affected by the change. In one embodiment, a new policy decision based on the policy change is provided along with the notification. In another embodiment, when a policy enforcement point receives a notification, it flags (marks) the resource(s) or policy decision(s) that are affected by the change, and an updated policy decision is requested only if there is a subsequent request for the resource(s). That is, in the latter embodiment, a policy evaluation point only requests an updated policy decision if the updated policy decision is needed. This type of approach can result in further efficiency improvements.

As noted above, in some cases, a policy enforcement point (e.g., Web server 91) cannot receive notifications. For example, a firewall may prevent notifications from reaching Web server 91. In those cases, the policy enforcement point polls the policy decision point (e.g., first policy engine 63) on a periodic basis to request that any updated policy decisions be returned. As described above, first policy engine 63 is aware of the resources that reside on Web server 91. Alternatively, first policy engine 63 is aware of the policy decisions that it previously provided to Web server 91, and is also aware which policy decisions are affected by a change in a policy definition. Thus, first policy engine 63 can respond to a polling request from Web server 91 with new (updated) policy decisions for specific resources. Alternatively, in the polling request, Web server 91 can identify the policy decisions it has in storage, and first policy engine 63 can use that information to return specific updates.

Conditions/Advices

It is recognized that there are instances in which, based on a policy decision returned from the policy server (e.g., first policy engine 63), the policy enforcement point (e.g., Web server 61) is responsible for performing some type of action before access to a resource can be granted (or denied). For example, as mentioned above, a requestor is authenticated using some type of authentication scheme. Authentication schemes include, but are not limited to LDAP (Lightweight Directory Access Protocol), Radius, and Safeword.

Consider an example in which a resource is protected using a particular authentication scheme (e.g., LDAP). Accordingly, a policy decision for the resource may specify that this particular type of authentication scheme be used. According to embodiments of the present invention, the policy decision returned by the policy server to the policy enforcement point includes this condition in a form that is also referred to herein as an "advice." As previously described herein, a policy definition can include one or more conditions. An advice can be viewed as a condition that is provided to a policy enforcement point. An advice can also be derived from a condition. In one embodiment, conditions are Java interfaces, and the advices are set in each condition implementation.

In one embodiment, an advice or condition is in the form of a key and a value. An example of a policy decision providing a condition or advice is:

resource: http://www.abc.com/MyAbc action: GET advice: authentication module=LDAP In the example above, the key is "authentication module" and the value is "LDAP."

In general, an advice or condition instructs the policy enforcement point to take some type of action based on the policy decision. Continuing with the example above, should the requestor be authenticated with an authentication scheme other than LDAP, the policy enforcement point (e.g., Web server 61) can communicate to the requester that authentication using LDAP is required.

In this manner, conditions are implemented and enforced locally at the policy enforcement point (e.g., by Web server 61) as advices. This can result in efficiency improvements, because it is not necessary for the policy enforcement point to communicate further with the policy server (e.g., first policy engine 63) in order to either learn of or enforce the condition/advice. Instead, Web server 61 can communicate the condition directly to the requestor (e.g., user node 92) without having to communicate with first policy server 63. In addition, Web server 61 can determine whether the condition is satisfied without having to communicate with first policy server 63.

Time-To-Live

In some instances, a policy decision is valid only for a certain period of time. To address those instances, the policy decision returned by the policy server can include a condition (or advice) limiting the time that the policy decision remains valid and in effect. This condition is referred to herein as a "time-to-live" condition. In essence, a time-to-live condition in a policy decision represents a special form of an advice.

An example of a policy decision providing a time-to-live is:

resource: http://www.abc.com action: GET action value: allow time to live: 10 minutes In the above example, the policy decision is in effect for ten minutes only. It is appreciated that the time-to-live condition can be expressed in other formats. For example, the time-to-live condition can be expressed as a deadline or as a time interval.

Once a policy decision having a time-to-live condition expires, subsequent requests from the user for the resource(s) associated with the policy decision are denied. In one embodiment, upon expiration of the policy decision, the policy enforcement point (e.g., Web server 61) automatically checks with the policy server (e.g., policy engine 63) to see if there is a policy change or to determine whether the policy decision can be renewed.

Method of Access Control

Figure 5:
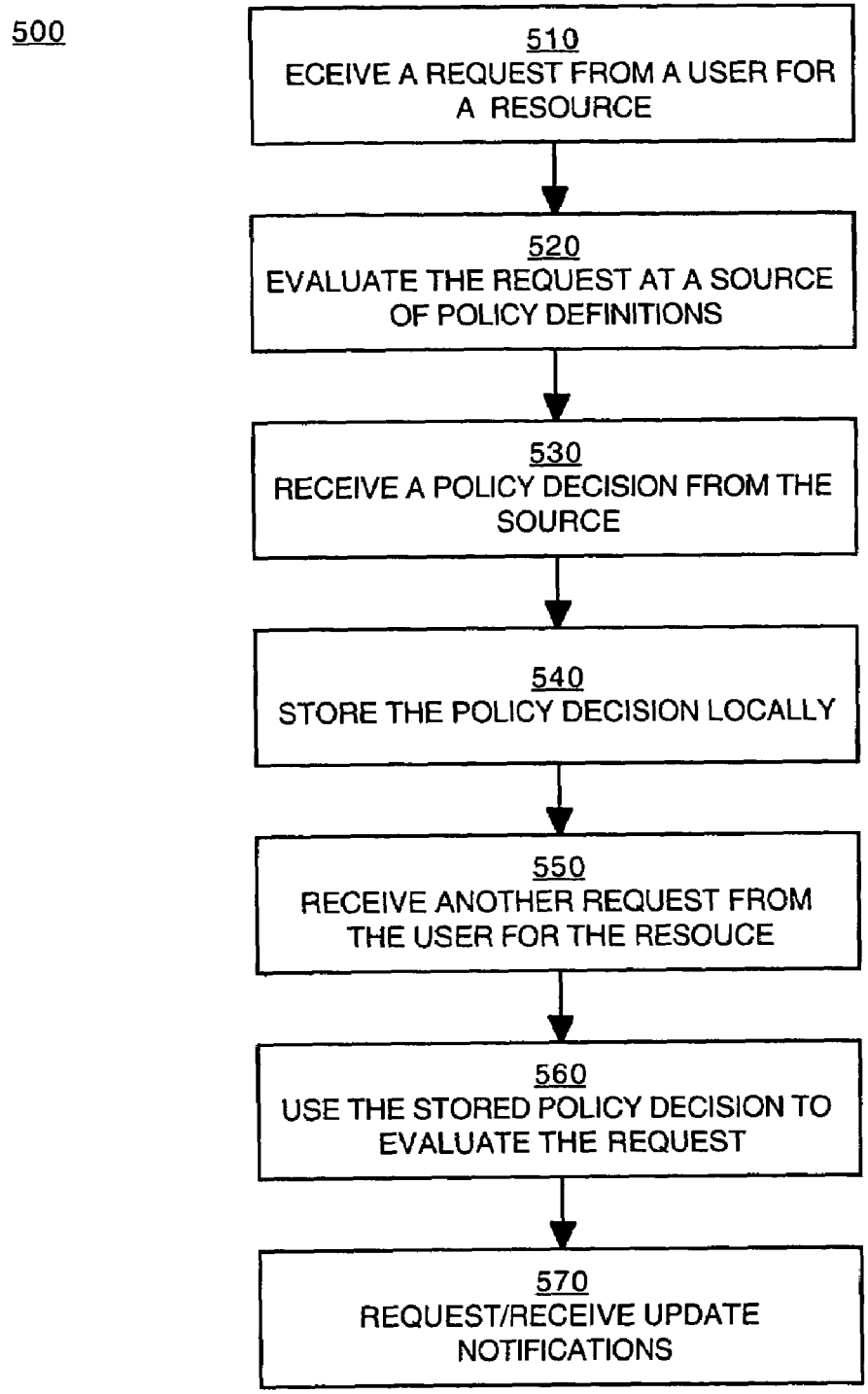
FIG. 5 is a flowchart of a computer-controlled method for controlling access to a resource in accordance with one embodiment of the present invention.

FIG. 5 is a flowchart 500 of a computer-controlled method for controlling access to a resource in accordance with one embodiment of the present invention. Although specific steps are disclosed in flowchart 500, such steps are exemplary. That is, embodiments of the present invention are well suited to performing various other steps or variations of the steps recited in flowchart 500. It is appreciated that the steps in flowchart 500 can be performed in an order different than presented, and that not all of the steps in flowchart 500 may be performed. In one embodiment, the method of flowchart 500 is implemented by a computer system such as computer system 112 of FIG. 2, embodied as Web server 61 or Web server 91 of FIG. 4.

In step 510 of FIG. 5, in the present embodiment, an initial request is received from a user for a resource. For example, referring to FIG. 4, a requester at user node 92 makes a request for a resource that resides on, or is under the control of, Web server 61.

In step 520 of FIG. 5, if the requested resource is subject to an access control policy, the initial request is referred to a source of policy definitions (e.g., a policy decision point or policy server) for evaluation. For example, referring to FIG. 4, the initial request is referred to first policy engine 63.

In step 530 of FIG. 5, the initial request is evaluated, a policy decision is made, and the policy decision is received from the policy source. For example, referring to FIG. 4, first policy engine 63 makes the policy decision, and the policy decision is returned to Web server 61. Web server 61 can also be referred to as a policy enforcement point. In this regard, Web server 61 serves as a remote interface for first policy engine 63.

In one embodiment, the policy decision is specific to the requestor (or to a group associated with the requester). The policy decision can be for the requested resource only. In addition, policy decision(s) for other resources affiliated with the requested resource can also be provided in response to the initial request. Furthermore, the policy decision(s) can include conditions/advices, including time-to-live advices, as explained above.

In step 540 of FIG. 5, the policy decision is stored (or cached) locally at the policy enforcement point. For example, with reference to FIG. 4, the policy decision is stored at Web server 61. Specifically, in one embodiment, the policy decision is stored in policy decision cache 67 of FIG. 3.

In step 550 of FIG. 5, another request (from the same user) for the resource is received at Web server 61 of FIG. 4, for example.

In step 560 of FIG. 5, with reference also to FIG. 4, instead of referring the request of step 550 to the source of policy definitions (e.g., to first policy engine), the policy enforcement point (e.g., Web server 61) evaluates the request locally using the stored (cached) policy decision. The policy enforcement point can also locally implement and enforce any conditions/advices associated with the policy decision.

In step 570 of FIG. 5, the policy enforcement point (e.g., Web server 61 of FIG. 4) receives notification of any change to the policy decision. If there is a change, the policy enforcement point can receive, along with the notification, an updated policy decision. Alternatively, the policy enforcement point can tag (or otherwise identify) the affected policy decision and request an updated policy decision only if the user later requests access to the associated resource. In those situations in which the policy enforcement point cannot receive a notification, the policy enforcement point can send a message to the policy source (e.g., first policy engine 63 of FIG. 4) on a periodic basis, requesting any update to the policy decision.

Exemplary Extensible Markup Language Interfaces

Provided below is an example of a DTD (document type definition) that defines the XML (Extensible Markup Language) interfaces that can be used to evaluate policies and get policy decisions for users according to one embodiment of the present invention.

```
-->
<!--    PolicyService element is the root element for remote policy
        service. This XML interface will be typically used between the
        remote interface (PEP) and the policy server. The PEP uses the
        PolicyRequest element to request information from the server and
        the server responds using the PolicyResponse element. The policy
        server would use PolicyNotification to send policy or subject
        change notifications to the PEP.
-->
<!ELEMENT       PolicyService           ( PolicyRequest
                                        | PolicyResponse
                                        | PolicyNotification ) >
<!ATTLIST       PolicyService
        version         CDATA           "1.0"
>
<!--    PolicyRequest element is used by the PEP to request the policy
        evaluation decisions or to add/remove a policy listener. The
        attribute appSSOToken provides the SSO token of the PEP as its
        identity that can be used by the policy server to check if the PEP
        can receive the request information. The attribute requestId
        specifies the identity (ID) of the request.
-->
<!ELEMENT       Policy Request          ( GetResourceResults
                                        | AddPolicyListener
                                        | RemovePolicyListener ) >
   <!ATTLIST PolicyRequest
        appSSOToken     CDATA           #REQUIRED
        requestId       CDATA           #REQUIRED
>
<!--    GetResourceResults element is used by the PEP to request the
        policy evaluation decisions for a particular user regarding a
        given service and a resource and possibly its sub-resources. The
        attribute userSSOToken provides the identity of the user. The
        attribute serviceName specifies the service name and
        resourceName specifies the name of the resource for which the
        policy is evaluated. The attribute resourceScope gives the scope
        of the resources in terms of the policy evaluation. The value of
        the attribute could be "self" or "subtree." Value "self" means the
        resource node itself only; value "subtree" means to get the whole
        subtree with the resource node being the root. The sub-element
        EnvParameters provides the environment information that may be
        useful during the policy evaluation. The sub-element
        GetResponseDecisions requests for the values for a set of user
        response attributes.
-->
<!ELEMENT       GetResourceResults      ( EnvParameters?, GetResponseDecisions? ) >
<!ATTLIST       GetResourceResults
        userSSOToken    CDATA           #REQUIRED
        serviceName     NMTOKEN         #REQUIRED
        resourceName    CDATA           #REQUIRED
        resourceScope   (self | subtree)  "subtree"
>
<!--    EnvParameters element provides the environment information that
        may be useful in the policy evaluation. The sub-element
        AttributeValuePair provides the environment parameter name and its
        values.
-->
<!ELEMENT       EnvParameters           ( AttributeValuePair+ ) >
<!--    AttributeValuePair defines generic attribute-value pairs that can
        be used to specify configuration information. The value for an
        attribute can be empty.
-->
<!ELEMENT       AttributeValuePair      (Attribute, Value*) >
<!--    Attribute defines the attribute name, e.g., a configuration
        parameter.
```

-continued

```
-->
<!ELEMENT    Attribute           EMPTY >
<!ATTLIST    Attribute
     name        NMTOKEN         #REQUIRED
>
<!-- Value element represents a value string.
-->
<!ELEMENT    Value  ( #PCDATA ) >
<!-- GetResponseDecisions includes a set of user attribute names.
-->
<!ELEMENT    GetResponseDecisions    ( Attribute+ ) >
<!-- AddPolicyListener element adds a policy listener to the service to
     receive the policy notification. The attribute serviceName
     specifies the service name. The attribute notificationURL
     provides the notification URL for the policy server to send the
     notification to.
-->
<!ELEMENT    AddPolicyListener     EMPTY >
<!ATTLIST    AddPolicyListener
     serviceName      NMTOKEN      #REQUIRED
     notificationURL  CDATA        #REQUIRED
>
<!-- RemovePolicyListener element removes the policy listener from the
     service. The attribute serviceName specifies the service name.
     The attribute notificationURL provides the notification URL for
     which the corresponding policy listener needs to be removed.
-->
<!ELEMENT    RemovePolicyListener  EMPTY >
<!ATTLIST    RemovePolicyListener
     serviceName      NMTOKEN      #REQUIRED
     notificationURL  CDATA        #REQUIRED
>
<!-- PolicyResponse element is used by the policy server to return a
     response to the PEP. If the PEP request is a policy evaluation
     request, then the policy decision is sent back using
     ResourceResult. If the PEP request is a policy listener addition,
     then an acknowledgement is sent back using
     AddPolicyListenerResponse. If the PEP request is a policy
     listener removal, then an acknowledgement is sent back using
     RemovePolicyListenerResponse. If anything wrong happens during
     the request processing, an error message is sent back to the PEP
     using Exception. The attribute requestId specifies the ID of the
     request to which the response is in regard.
-->
<!ELEMENT    PolicyResponse       ( ResourceResult+
                                  | AddPolicyListenerResponse
                                  | RemovePolicyListenerResponse
                                  | Exception) >
<!ATTLIST    PolicyResponse
     requestId   CDATA            #REQUIRED
>
<!-- ResourceResult element returns the policy evaluation decisions to
     the PEP. The attribute name specifies the resource name. If the
     GetResourceResults in the PolicyRequest doesn't provide a resource
     name with its resourceName attribute, the value of name will be an
     empty string. The sub-element PolicyDecision provides the policy
     evaluation decision for this resource.
-->
<!ELEMENT    ResourceResult       ( PolicyDecision, ResourceResult* ) >
<!ATTLIST    ResourceResult
     name     CDATA   #REQUIRED
>
<!-- PolicyDecision element returns the policy decision for the
     resource along with user attribute response if requested. A
     PolicyDecision can be empty. If there are no applicable policies
     defined for a given PolicyRequest, the policy decision is empty.
-->
<!ELEMENT    PolicyDecision       ( ActionDecision*, ResponseDecisions? ) >
<!-- ActionDecision element provides policy evaluation decision for the
     user in terms of the action specified in AttributeValuePair. The
     attribute timeToLive provides the time-to-live information of the
     policy decision in terms of the action. The sub-element
     AttributeValuePair provides the action name and its values. The
     sub-element Advices provides some additional information that may
     help the PEP to better understand the policy evaluation decision.
```

```
-->
<!ELEMENT      ActionDecision         ( AttributeValuePair, Advices? ) >
<!ATTLIST      ActionDecision
       timeToLive    CDATA      #IMPLIED
>
<!--   Advices element provides some additional information that may help
       the PEP better understand the policy decision.
-->
<!ELEMENT      Advices                ( AttributeValuePair+ ) >
<!--   ResponseDecisions includes the user attribute responses.
-->
<!ELEMENT      ResponseDecisions      ( AttributeValuePair+ ) >
<!--   AddPolicyListenerResponse element is used by the policy server to
       send back an acknowledgement of the success of adding a policy
       listener.
-->
<!ELEMENT      AddPolicyListenerResponse    EMPTY >
<!--   RemovePolicyListenerResponse element is used by the policy server
       to send back an acknowledgement of the success of removing a
       policy listener.
-->
<!ELEMENT      RemovePolicyListenerResponse    EMPTY >
<!--   Exception element is used by the policy server to send back an
       error message.
-->
<!ELEMENT      Exception        (#PCDATA) >
<!--   PolicyNotification element specifies a policy notification. The
       attribute notification Id is used for identifying the
       notification.
-->
<!ELEMENT      PolicyNotification     ( PolicyChangeNotification ) >
<!ATTLTST      PolicyNotification
       notificationId    CDATA      #REQUIRED
>
<!--   PolicyChangeNotification element sends a notification to the PEP
       if a policy regarding the service has been changed. The attribute
       serviceName specifies the service name. The attribute type
       specifies the policy change type. The sub-element ResourceName
       specifies the name of the resource that is affected by the policy
       change.
-->
<!ELEMENT      PolicyChangeNotification    ( ResourceName* ) >
<!ATTLIST      PolicyChangeNotification
       serviceName    NMTOKEN      #REQUIRED
       type           (added | modified | deleted) "modified"
>
<!--   ResourceName element represents a resource name.
-->
<!ELEMENT      ResourceName      ( "PCDATA ) >
```

In summary, the embodiments of the present invention provide methods and systems that can more efficiently implement access control policies. According to these embodiments, policy decisions are more efficiently implemented using a remote interface (e.g., at the policy enforcement point). As a result, network resources are conserved.

Embodiments of the invention may be implemented using a computer-usable medium. Specifically, a computer-usable medium may have computer-readable program code embodied therein for causing a computer system to perform the one or more of the embodiments discussed above for controlling access to resources.

Embodiments of the present invention, remote interface for policy decisions governing access control, have been described. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of controlling access to resources, said method comprising:

receiving, by a server, a first request for a resource, said first request comprising a first requestor identifying information, wherein said first requestor identifying information identifies a first requestor;

referring, by said server, said first request to a remote source, wherein said remote source evaluates said first request in response to said referring to generate a first policy decision, wherein said first policy decision is based on a policy definition governing access to said resource and based on said first requestor identify information;

receiving, by said server, said first policy decision from said remote source, wherein said first policy decision is for said first requestor;

storing said first policy decision for said resource in local memory, wherein said local memory further comprises a second policy decision, wherein said second policy decision is based on a second requestor identifying information, and wherein said second policy decision is for a second requestor identified by said second requestor identifying information;

receiving, subsequent to said first request, a second request for access to said resource, said second request comprising said first requestor identifying information;

evaluating said second request using said first policy decision in said local memory;

receiving a notification from said remote source of a change in said policy definition, said notification identifying said first policy decision;

marking said first policy decision based on said notification, wherein said marking identifies that an updated policy decision must be requested when a subsequent request from said first requestor is received for said resource;

receiving, subsequent to said second request, a third request for access to said resource, said third request comprising said second requestor identifying information, wherein said second requestor identifying information identifies said second requestor;

evaluating said third request using said second policy decision in said local memory based on said second policy decision being unmarked, wherein said first policy decision is marked and said second policy decision is unmarked in local memory when said third request is evaluated;

receiving, by said server and subsequent to said third request, a fourth request for said resource after said third request is received, said fourth request comprising said first requestor identifying information, wherein said fourth requestor identifying information identifies said first requestor;

identifying, by said server in response to said fourth request, said first policy decision as marked;

referring, by said server, said fourth request to said remote source based on said first policy decision being marked, wherein said remote source evaluates said fourth request in response to said referring to generate a third policy decision;

receiving, by said server, said third policy decision from said remote source; and evaluating said fourth request based on said third policy decision.

2. The method of claim 1 wherein said resource is affiliated with another resource, and wherein further a fourth policy decision for said other resource is received from said remote source and stored in said local memory.

3. The method of claim 1 wherein a period of time said first policy decision is valid is also received from said remote source and stored locally.

4. The method of claim 1 wherein a condition associated with said first policy definition is also received from said remote source and stored locally, wherein said condition is enforced locally.

5. A method of controlling access to resources, said method comprising:

receiving, by a server, a first request for access to a first resource, said first request comprising a first requestor identifying information, wherein said first requestor identifying information identifies a first requestor;

referring, by said server, said first request to a remote source, wherein said remote source evaluates said first request in response to said referring to generate a first policy decision, wherein said first policy decision is based on a policy definition governing access to said first resource and based on said first requestor identify information;

receiving, by said server, from said remote source said first policy decision for said first resource, wherein said first policy decision is for said first requestor;

storing said first policy decision in local memory, wherein said local memory further comprises a second policy decision, wherein said second policy decision is based on a second requestor identifying information, and wherein said second policy decision is for a second requestor;

receiving a second request for access to said first resource, said second request comprising said first requestor identifying information;

evaluating said second request using said first policy decision in said local memory;

receiving a notification from said remote source of a change in said policy definition, said notification identifying said first resource;

marking said first policy decision based on said notification and said first policy decision associated with said first resource, wherein said marking identifies that an updated policy decision must be requested when a subsequent request from said first requestor is received for said first resource;

receiving a third request for access to said first resource, said third request comprising said second requestor identifying information, wherein said second requestor identifying information identifies said second requestor;

evaluating said third request using said second policy decision in said local memory based on said second policy decision being unmarked, wherein said first policy decision is marked and said second policy decision is unmarked in local memory when said third request is evaluated;

receiving, by said server, a fourth request for said first resource after said third request is received, said fourth request comprising said first requestor identifying information, wherein said fourth requestor identifying information identifies said first requestor;

identifying, by said server in response to said fourth request, said first policy decision as unmarked;

referring, by said server, said fourth request to said remote source based on said first policy decision being marked, wherein said remote source evaluates said fourth request in response to said referring to generate a third policy decision;

receiving, by said server, said third policy decision from said remote source; and evaluating said fourth request based on said third policy decision.

6. The method of claim 5 wherein said first resource is affiliated with another resource, wherein a fourth policy decision for said other resource is received from said remote source and stored in said local memory.

7. The method of claim 5 further comprising:

receiving information that identifies a period of time said first policy decision is valid.

8. The method of claim 5 further comprising:

receiving from said remote source a condition associated with said first policy definition, wherein said condition is enforced locally.

9. A computer-usable medium having computer-readable program code embodied therein for causing a computer system to perform a method of controlling access to resources, said method comprising:
- receiving, by a server, a first request for a first resource, said first request comprising a first requestor identifying information, wherein said first requestor identifying information identifies a first requestor;
- referring, by said server, said first request to a remote source, wherein said remote source evaluates said first request in response to said referring to generate a first policy decision, wherein said first policy decision is based on a policy definition governing access to said first resource and based on said first requestor identify information;
- receiving, by said server, said first policy decision from said remote source, wherein said first policy decision is for said first requestor;
- storing in local memory said first policy decision for said first resource, wherein said local memory further comprises a second policy decision, wherein said second policy decision is based on a second requestor identifying information, and wherein said second policy decision is for a second requestor;
- receiving, subsequent to said first request, a second request for access to said first resource, said second request comprising said first requestor identifying information;
- evaluating said second request using said first policy decision stored in said local memory;
- receiving a notification from said remote source of a change in said policy definition, said notification identifying said first policy decision;
- marking said first policy decision based on said notification, wherein said marking identifies that an updated policy decision must be requested when a subsequent request from said first requestor is received for said first resource;
- receiving, subsequent to said second request, a third request for access to said first resource, said third request comprising said second requestor identifying information, wherein said second requestor identifying information identifies said second requestor;
- evaluating said third request using said second policy decision in said local memory based on said second policy decision being unmarked, wherein said first policy decision is marked and said second policy decision is unmarked in local memory when said third request is evaluated;
- receiving, by said server and subsequent to said third request, a fourth request for said first resource after said third request is received, said fourth request comprising said first requestor identifying information, wherein said fourth requestor identifying information identifies said first requestor;
- identifying, by said server in response to said fourth request, said first policy decision as marked;
- referring, by said server, said fourth request to said remote source based on said first policy decision being marked, wherein said remote source evaluates said fourth request in response to said referring to generate a third policy decision;
- receiving, by said server, said third policy decision from said remote source; and
- evaluating said fourth request based on said third policy decision.

10. The computer-usable medium of claim 9 wherein said first resource is affiliated with another resource, wherein a fourth policy decision for said other resource is received from said remote source and stored in said local memory.

11. The computer-usable medium of claim 9 wherein a period of time said first policy decision is valid is also received from said remote source and stored locally.

12. The computer-usable medium of claim 9 wherein a condition associated with said first policy definition is also received from said remote source and stored locally, wherein said condition is enforced locally.

* * * * *